(12) United States Patent
Agrawal et al.

(10) Patent No.: US 9,231,881 B2
(45) Date of Patent: *Jan. 5, 2016

(54) TRANSPARENT MIDDLEBOX WITH GRACEFUL CONNECTION ENTRY AND EXIT

(75) Inventors: Dakshi Agrawal, Monsey, NY (US); Thai V. Le, White Plains, NY (US); Erich M. Nahum, New York, NY (US); Vasileios Pappas, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 13/568,941

(22) Filed: Aug. 7, 2012

(65) Prior Publication Data

US 2014/0040457 A1 Feb. 6, 2014

Related U.S. Application Data

(63) Continuation of application No. 13/562,603, filed on Jul. 31, 2012.

(51) Int. Cl.
*H04L 12/905* (2013.01)
*H04L 12/893* (2013.01)
*H04L 29/08* (2006.01)
(Continued)

(52) U.S. Cl.
CPC ............ *H04L 47/40* (2013.01); *H04L 67/28* (2013.01); *H04L 67/2809* (2013.01); *H04L 67/2814* (2013.01); *H04L 47/193* (2013.01); *H04L 69/16* (2013.01)

(58) Field of Classification Search
CPC .. H04L 67/28; H04L 67/2809; H04L 67/2814
USPC ........................................................ 709/232
See application file for complete search history.

(56) References Cited

U.S. PATENT DOCUMENTS 7,035,252 B2    4/2006  Cave et al.
8,209,700 B2 *  6/2012  Andreev et al. ............... 718/105
(Continued)

OTHER PUBLICATIONS

Floyd, S., et al. "Adding Acknowledgement Congestion Control to TCP (RFC5690)" Feb. 2010. pp. 1-33. www.priorartdatabase.com/IPCOM/000193123.

(Continued)

*Primary Examiner* — Aaron Strange
(74) *Attorney, Agent, or Firm* — Tutunjian & Bitetto, P.C.; Jennifer R. Davis

(57) ABSTRACT

Middlebox systems that can enter a connection include a monitoring module to monitor information in a connection between a client and a server, a processor to determine that the connection is idle, a table configured to create a first entry for the client and a second entry for the server, where the entries are initialized using information gathered by the monitoring module, and a control module to redirect the connection between the client and server to the middlebox. Middlebox systems that can exit a connection include a processor to determine a mismatch between sequence numbers in a first connection to a client device and in a second connection to a server device. A network control module delays acknowledgment signals from the middlebox on a connection to decrease the degree of mismatch and establishes a direct connection between the client device and the server device when mismatch is zero.

11 Claims, 5 Drawing Sheets

(51) Int. Cl.
*H04L 29/06* (2006.01)
*H04L 12/801* (2013.01)

(56) References Cited

U.S. PATENT DOCUMENTS

| | | | |
|---|---|---|---|
| 8,224,966 B2* | 7/2012 | Tate et al. | 709/227 |
| 8,527,647 B2* | 9/2013 | Gopalakrishnan | 709/231 |
| 2001/0005372 A1 | 6/2001 | Cave et al. | |
| 2003/0200332 A1 | 10/2003 | Gupta et al. | |
| 2005/0188101 A1* | 8/2005 | Ludwig et al. | 709/238 |
| 2005/0232238 A1 | 10/2005 | Oran | |
| 2005/0240940 A1* | 10/2005 | Quinet et al. | 719/315 |
| 2006/0085559 A1* | 4/2006 | Lownsbrough et al. | 709/238 |
| 2007/0109961 A1 | 5/2007 | Liang | |
| 2007/0140159 A1* | 6/2007 | Eronen et al. | 370/328 |
| 2007/0147245 A1 | 6/2007 | Foore et al. | |
| 2007/0183375 A1 | 8/2007 | Tiwari | |
| 2008/0072305 A1* | 3/2008 | Casado et al. | 726/11 |
| 2009/0147685 A1 | 6/2009 | Malhotra | |
| 2009/0154389 A1 | 6/2009 | Srikrishna et al. | |
| 2009/0175204 A1 | 7/2009 | Kim | |
| 2009/0187673 A1 | 7/2009 | Ramjee et al. | |
| 2011/0096750 A1 | 4/2011 | Velandy et al. | |
| 2012/0154506 A1* | 6/2012 | Sylvain et al. | 348/14.01 |
| 2012/0265810 A1 | 10/2012 | Reid et al. | |
| 2013/0003735 A1* | 1/2013 | Chao et al. | 370/392 |
| 2014/0051485 A1* | 2/2014 | Wang et al. | 455/574 |

OTHER PUBLICATIONS

Lee, J., et al. "Network Integrated Transparent TCP Accelerator" 2010 24th IEEE International Conference on Advanced Networking and Applications. Apr. 2010. pp. 285-292.

Srisuresh, P., et al. "Middlebox Communication Architecture and Framework (RFC3303)" Aug. 2002. pp. 1-33. www.ip.com/pubview/IPCOM000009353D.

Office Action dated Jan. 8, 2015 for U.S. Appl. No. 13/590,967 (20 pages).

* cited by examiner

TRANSPARENT MIDDLEBOX WITH GRACEFUL CONNECTION ENTRY AND EXIT

RELATED APPLICATION INFORMATION

This application is a Continuation application of copending U.S. patent application Ser. No. 13/562,603 filed on Jul. 31, 2012, incorporated herein by reference in its entirety.

BACKGROUND

1. Technical Field

The present invention relates to network optimization and, more particularly, to the addition and removal of middleboxes from existing network connections.

2. Description of the Related Art

With the growth in mobile data traffic, network congestion has become a major issue for mobile network operators. In response, vendors have been offering a large number of network appliances, commonly called middleboxes, to alleviate network congestion. Those middleboxes are designed to reduce transmission delays and improve the throughput of wireless users. A middlebox may be, e.g., a proxy or network optimizer. Proxies such as split-TCP split a network connection between a client and server into two transmission control protocol (TCP) connections. This splitting decouples the network congestion and flow controls on the two legs of the connection and has been shown to improve performance, especially when the client-to-proxy segment has a low round-trip time and high packet losses, while the proxy-to-server segment has a high trip time and low packet losses. Network optimizers eliminate redundancy in network flows and thereby reduce the resource utilization between two wide-area network optimizer gateways.

To simplify the configuration and management of users, middleboxes are preferably introduced in the network to operate in a transparent mode, where the middlebox first intercepts a TCP connection setup request from the client and then initiates a new TCP connection from the middlebox to the server. Such approach allows the middlebox to fully intercept and analyze the requests from the users. In addition, since both TCP connections (a) from client to middlebox, and (b) from middlebox to the end-server, have the source and destination IP addresses set to those of the client and end server, the presence of the middlebox is rendered invisible to the users.

However, existing middlebox solutions must be engaged at the beginning of a network connection and, once engaged, cannot be disengaged. As network conditions change, the use of a middlebox may become superfluous or even degrade connection quality. For example, during the retrieval of a large file, a user may move or the conditions of the network may change in such a way that the presence of a middlebox can slow down the connection. Because existing middleboxes are forced to remain in the path, CPU resources at the middlebox are consumed that would be better used in serving other users. Similarly, if conditions change such that a connection could benefit from a middlebox, existing middlebox solutions cannot insert a middlebox in a pre-existing connection.

Because the two connections are independent and have their own sequence numbers, it is not feasible using existing middlebox solutions to add or remove a middlebox. If the middlebox stops processing the packets from the client but simply forwards them to the server, the sequence number will not match the sequence number that is expected by the server. Similarly, if a connection were added to the middlebox in the middle of a transfer, a standard TCP stack would not recognize it and terminate the connection.

SUMMARY

A method for inserting a middlebox in an existing network connection includes monitoring network state information in a network connection between a client device and a server device; determining that the connection between the client device and the server device is idle; creating a first connection entry at the middlebox for the client device and a second connection entry at the middlebox for the server device, where the first and second connection entries are initialized using state information gathered by monitoring the network connection between the client device and the server device; and activating redirection of the network connection between the client device and the server device such that the middlebox mediates the connection between the client device and the server device.

A method for removing a middlebox from an existing network connection includes determining a degree of mismatch between a sequence number in a first connection between the middlebox and a client device and a sequence number in a second connection between the middlebox and a server device; delaying acknowledgment signals from the middlebox on a connection to decrease the degree of mismatch between sequence numbers; determining that the degree of mismatch between sequence numbers is zero; and establishing a direct connection between the client device and the server device without mediation by the middlebox.

A middlebox includes a network monitoring module configured to monitor network state information in a network connection between the client device and the server device; a processor configured to determine that the connection between the client device and the server device is idle; a connection table configured to create a first connection entry at the middlebox for the client device and a second connection entry at the middlebox for the server device, where the first and second connection entries are initialized using state information gathered by the network monitoring module; and a network control module configured to activate redirection of the network connection between the client device and the server device to the middlebox, such that the middlebox mediates the connection between the client device and the server device.

A further embodiment of a middlebox includes a processor configured to determine a degree of mismatch between a sequence number in a first connection between the middlebox and a client device and a sequence number in a second connection between the middlebox and a server device; and a network control module configured to delay acknowledgment signals from the middlebox on a connection to decrease the degree of mismatch between sequence numbers and to establish a direct connection between the client device and the server device without mediation by the middlebox upon a determination that the degree of mismatch between sequence numbers is zero.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles allow a middlebox to gracefully enter an existing network connection and to gracefully exit a connection that it is already involved in. Exiting a connection may be achieved by synchronizing the connections between the client and the server, whereas entering a connection may be accomplished by detecting when the connection is idle and initiating redirection at that point. The present principles may be implemented without any changes to existing transmission control protocol (TCP) algorithms, including slow start, congestion control, etc. Instead, the present principles use the ability to specify client sequence number when creating a new TCP connection, to specify the server sequence number when completing the handshake, and to create a connection state via an out-of-band mechanism in place of a standard TCP three-way handshake.

Figure 1:
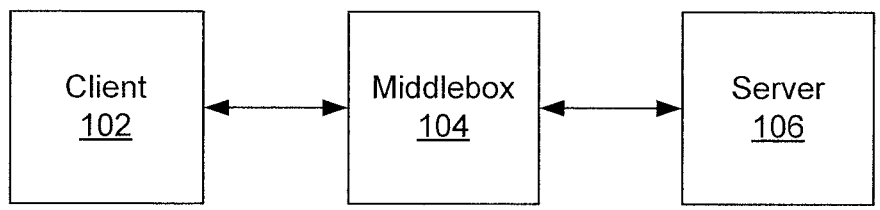
FIG. 1 is a diagram of two exemplary networks incorporating middleboxes according to the present principles.
Figure 1:
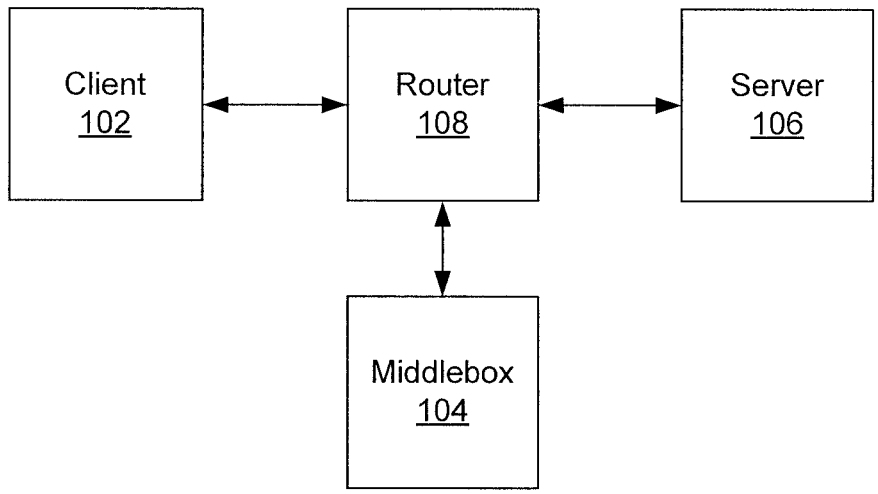

Referring now to the drawings in which like numerals represent the same or similar elements and initially to FIG. 1, two exemplary embodiments of a network that includes a middlebox 104 are shown. A first network 100 includes an in-band middlebox 104 that performs, e.g., routing functions between the client 102 and the server 106. Such a middlebox may monitor communications between the client 102 and the server 106 and may enter and exist such connections as needed. A second network 110 shows an out-of-band middlebox 104 that communicates with a router 108. The middlebox 104 continues to monitor the communications between client 102 and server 106, but instructs the router 108 to perform traffic redirection on its behalf using, e.g., the web cache communication protocol (WCCP). The present principles are described with particular focus on the in-band embodiment 100, but it should be recognized that the out-of-band embodiment shown in network 110 is equivalent for the purposes of implementing the present principles.

When a middlebox 104 begins to participate in a connection, the middlebox establishes two distinct connections, one from the client 102 and one from the end-server 106. It is specifically contemplated that such connections may represent TCP connections, though any appropriate network protocol may be used in its place. The present principles permit a middlebox 104 to operate transparently and to gracefully enter and exit a connection when needed. The network medium between the client 102 and the middlebox 104 is specifically contemplated as being at least partially wireless, but may be wholly wired or a combination of wired and wireless networks. Similarly the connection between the middlebox 104 and the server 106 is specifically contemplated as being a wired network, but may be any appropriate form of network.

When establishing a new TCP connection, the middlebox 104 reuses sequence numbers provided by the client 102 and the server 106. When exiting a connection, the middlebox 104 gradually synchronizes the connections between the client 102 and the server 106. The difference between sequence numbers in the respective connections is continuously decreased until they match, at which the middlebox 104 no longer needs to intercept and process the packets. Instead, the middlebox 104 can simply forward the packets received from the client 102 to the server 106 and vice versa.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
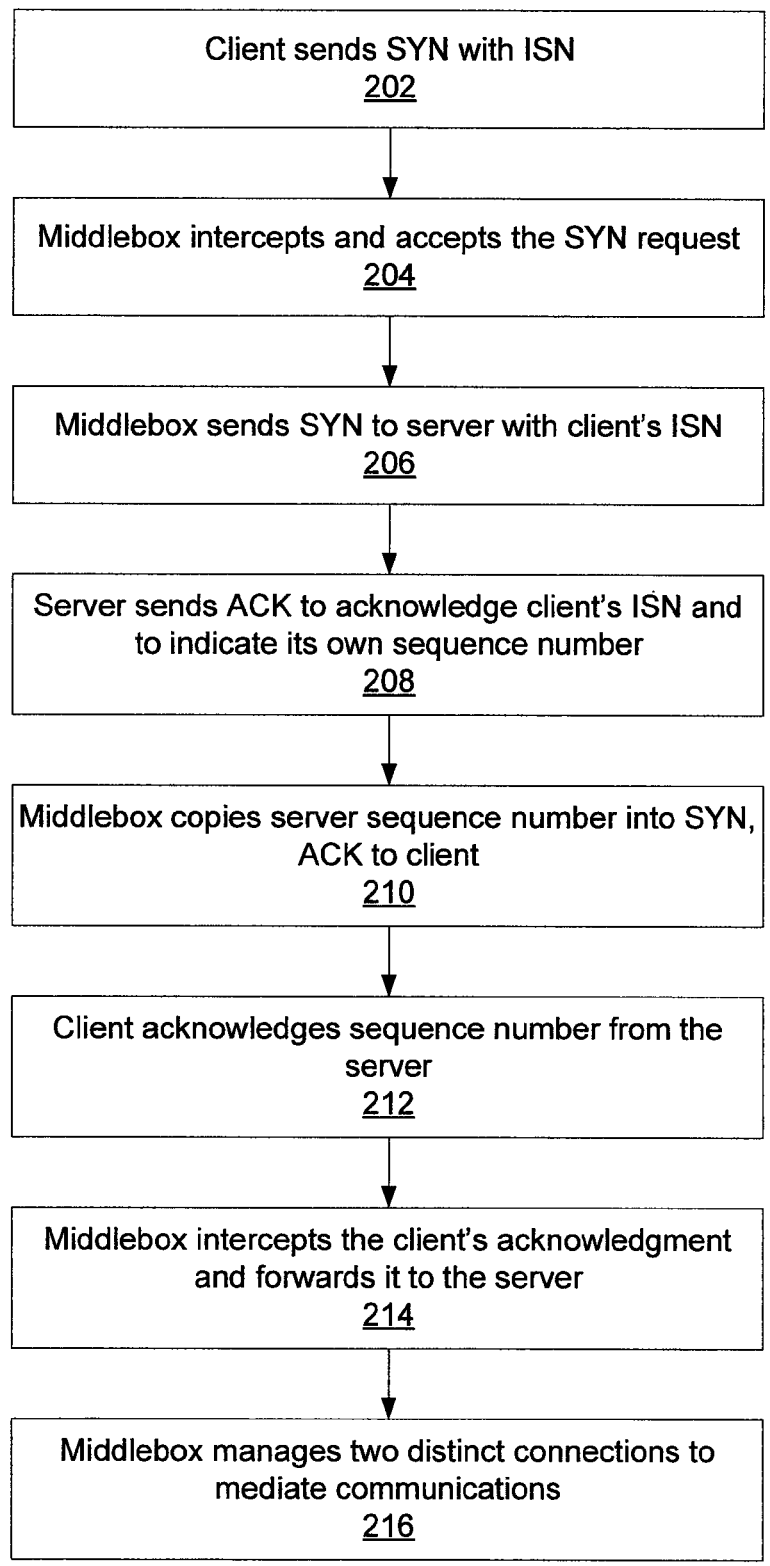
FIG. 2 is a block/flow diagram of a method for establishing a connection through a middlebox according to the present principles.

Referring now to FIG. 2, a method for establishing a connection through a middlebox 104 is shown. The client 102 sends a standard SYN request to server 106 in block 202 that includes its initial sequence number ISN and sets its acknowledgment field to zero. The ISN can be any appropriate number, e.g., 7765. At block 204, the middlebox 104 intercepts and accepts the SYN request from the client 102 and initiates a new SYN request to the end server 106 at block 206, copying the client's ISN as the sequence number. In addition, the middlebox 104 does not immediately reply to the client 102 with a SYN, ACK packet, but instead waits for the reply from the end-server 106 to determine the sequence number from the server 106.

At block 208, the end-server 106 sends an ACK to the middlebox 104 acknowledge the client's ISN and indicates its own sequence number in the sequence number field, e.g., 2234. The middlebox 104 intercepts the message and copies the server sequence number into the SYN, ACK to the client 102 in block 210, and the client acknowledges the sequence number at block 212. At block 214, the middlebox 104 intercepts the client's acknowledgment and forwards it to server 106. At this point, block 216, the middlebox 104 stands as an intermediary between the client 102 and the server 106 and processes packets traveling between the two. At this point, two TCP connections exist and can evolve independently for, e.g., a file transfer.

Figure 3:
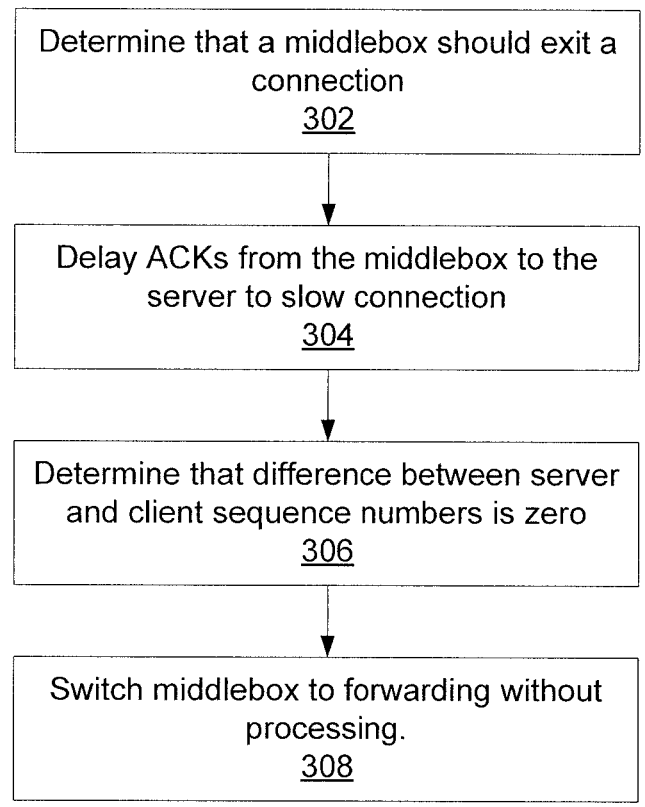
FIG. 3 is a block/flow diagram of a method for gracefully removing a middlebox from a connection according to the present principles.

Referring now to FIG. 3, a middlebox 104 that is participating in an existing connection removes itself from the path. At block 302, the middlebox 104 determines that its participation is unnecessary or detrimental to a connection between client 102 and server 106. This may be accomplished by measuring the packet loss rate and the round-trip time on the forwarding paths to the client 102 and the server 106 to determine how the benefits of the middlebox 104 change over time.

In most cases, the connections between the middlebox 104 and the client 102 and between the middlebox 104 and the server 106 become desynchronized during the lifetime of the connection. Block 304 delays sending ACKs to, e.g., the server 106 to decrease its sequence number relative to the sequence number of the client-middlebox connection. Alternatively, the middlebox 104 sends a receive window of 0 for the server 106 to stop sending it data. Block 306 determines when the difference between the sequence numbers of the two connections has reduced to zero. At this point, the middlebox is able to remove its processing from the connection path at block 308 and merely forward packets between client 102 and server 106. In the case of an out-of-band middlebox 104 as in network 110, the middlebox 104 can at this point remove itself from the path entirely by instructing the router 108 to end redirection and to resume normal communications between the client 102 and the server 106.

Figure 4:
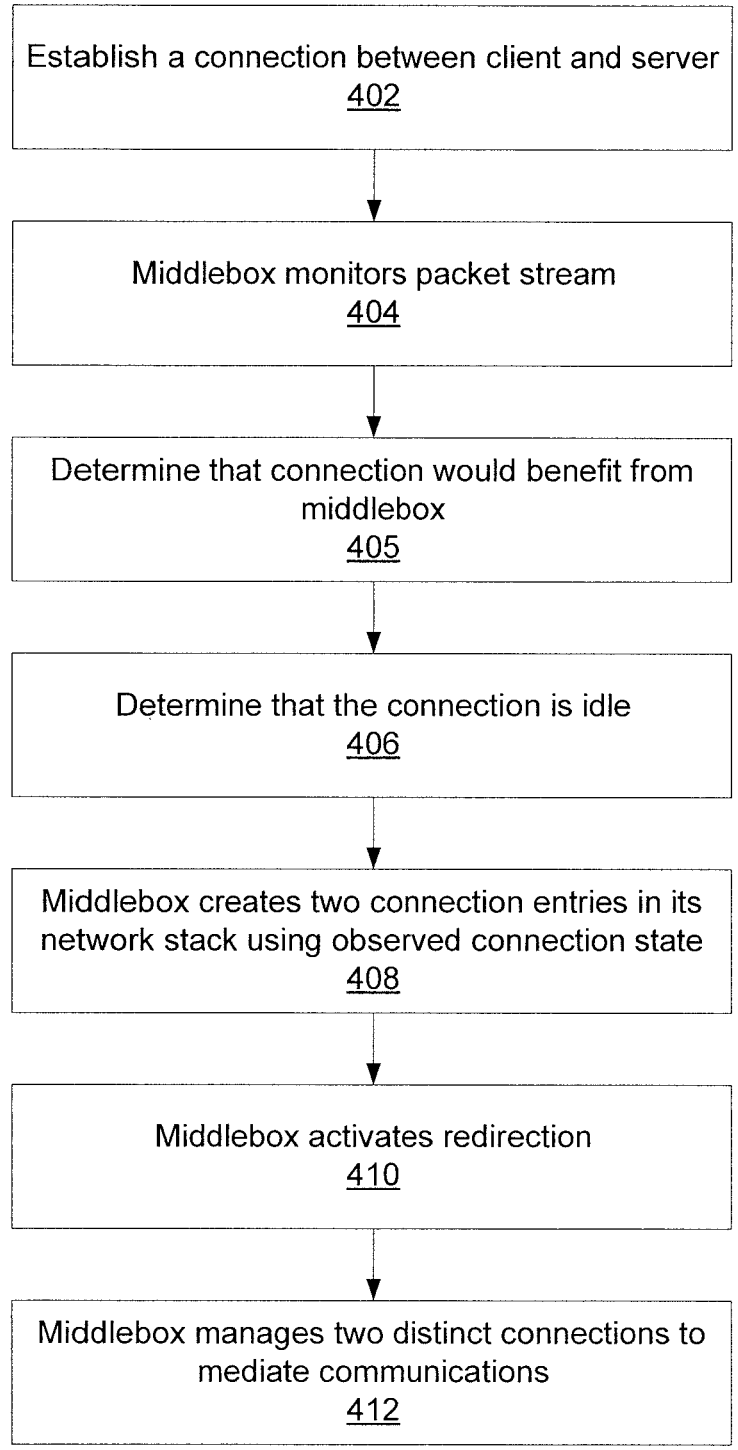
FIG. 4 is a block/flow diagram of a method for gracefully adding a middlebox to an existing connection according to the present principles.

Referring now to FIG. 4, a middlebox 104 enters an existing network connection between client 102 and server 106. At block 402, the client 102 and server 106 establish a connection according to the dictates of the relevant protocol. The middlebox 104 monitors the packet stream between the client 102 and the server 106 at block 404 using, e.g., a hardware tap or by replication using a router or switch 108. The monitoring may further include passive network monitoring by, e.g., receiving network packets broadcast on a network.

At block 405, the middlebox 104 determines that the connection could benefit from its intervention. This may be accomplished by measuring the packet loss rate and the round-trip time on the forwarding paths to the client 102 and the server 106 to determine how the benefits of the middlebox 104 change over time. The middlebox 104 then monitors for idleness in the connection at block 406 by observing that no data flows in either direction between client 102 and server 106 for at least a time period P. The middlebox 104 creates two connection entries in its network stack, one entry for the connection between the middlebox 104 and the client 102 and one entry for the connection between the middlebox 104 and the server 106, at block 408. Each entry is initialized using the current state of the connection based on the observations taken in block 404. The initialized state includes, e.g., IP addresses, TCP port numbers, TCP sequence numbers, TCP options, and other TCP state information such as an estimate of the congestion window.

At block 410 the middlebox 104 activates redirection by, e.g., changing its own rules from routing to redirection (in the case of in-band middleboxes 104) or by notifying a router 108 that the IP addresses should now be redirected (in the case of side-band middleboxes) using a protocol such as WCCP. At block 412 the middlebox 104 manages the two distinct connections to mediate communications between the client 102 and the server 106.

Figure 5:
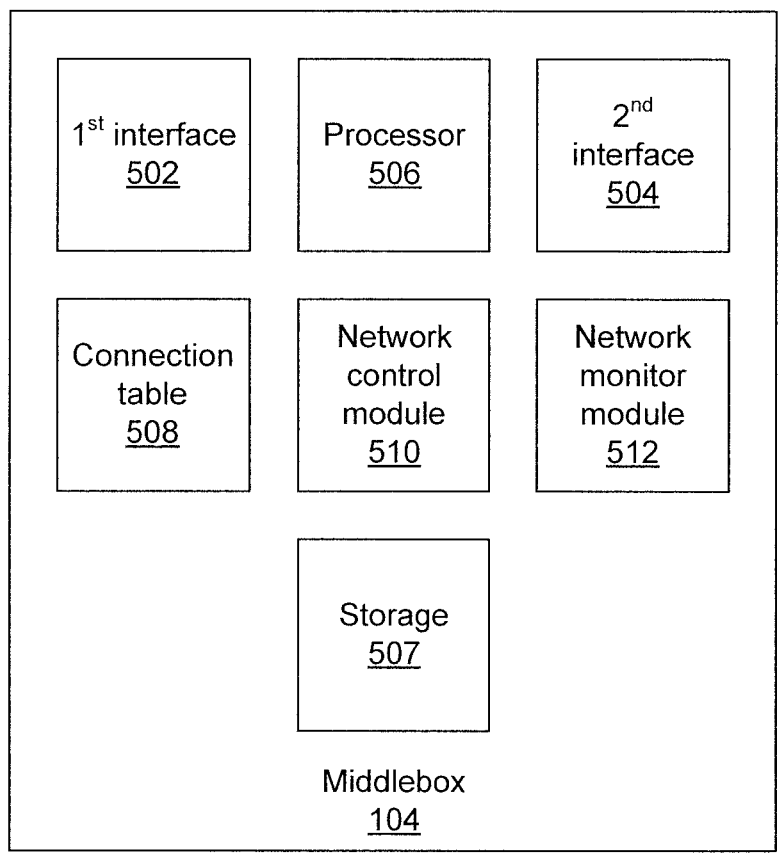
FIG. 5 is a diagram of a middlebox according to the present principles.

Referring now to FIG. 5, a diagram of a middlebox 104 is shown according to the present principles. The middlebox 104 includes two network interfaces 502 and 504 that communicate with the client 102 and the server 106. The two interfaces 502 and 504 may represent logical interfaces maintained on a single hardware interface, or they may be two separate hardware interfaces. In the case of two separate hardware interfaces, each interface may connect to the same network segment or to separate network segments.

The middlebox 104 further includes a connection table 508, which stores information regarding network connections maintained by the first and second interfaces 502 and 504. The connection table 508 may be stored in storage 507. A network control monitor module 512 uses the interfaces 502 and 504 to collect information regarding the state of connections on the interfaces 502 and 504, as well as information about other connections on the network. A processor 506 uses the monitored network information to determine whether a given connection would benefit from the intercession of the middlebox 104 and also determines when two connections to the middlebox 104 are out of sync. A network control module 510 manipulates connections to the client 102 and server 106 through the interfaces 502 and 504 to insert and remove the middlebox 104 from the connections as needed.

Having described preferred embodiments of a system and method for transparent middleboxes with graceful connection entry and exit (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A middlebox, comprising:
a network monitoring module configured to monitor network state information in a network connection between a client device and a server device;
a processor configured to determine that the connection between the client device and the server device is idle;
a connection table configured to create a first connection entry at the middlebox for the client device and a second connection entry at the middlebox for the server device, where the first and second connection entries are initialized using state information gathered by the network monitoring module after the processor determines that the connection between the client device and the server device is idle; and
a network control module configured to activate redirection of the network connection between the client device and the server device to the middlebox after the processor determines that the connection between the client device and the server device is idle, such that the middlebox manages the created first connection entry and second connection entry to replace the network connection and mediate the connection between the client device and the server device.

2. The middlebox of claim 1, wherein the network monitoring module is further configured to receive network information at the middlebox from a hardware tap to monitor network state information.

3. The middlebox of claim 1, wherein the network monitoring module is configured to receive network information at the middlebox from a separate network monitoring device to monitor network state information.

4. The middlebox of claim 1, wherein the middlebox is in-band with the network connection between the client device and the server device.

5. The middlebox of claim 4, wherein the network control module is further configured to change rules at the middlebox from routing to redirection to activate redirection.

6. The middlebox of claim 1, wherein the middlebox is out-of-band with the network connection between the client device and the server device.

7. The middlebox of claim 6, wherein the network control module is further configured to direct a router device to redirect the network connection between the client device and the server device through the middlebox to activate redirection.

8. The middlebox of claim 1, wherein the processor is further configured to determine that no information has been sent between the client device and the server device for at least a predetermined period of time to determining that the connection is idle.

9. The middlebox of claim 1, wherein the processor is further configured to determine whether the network connection between the client device and the server device would benefit from the middlebox's intercession based on monitored packet loss and round-trip times and to trigger the idle determination, the connection entry creation, and the redirection activation based on said determination.

10. The middlebox of claim 1, wherein the state information includes one or more of an IP address, port numbers, transport control protocol (TCP) sequence numbers, TCP options, and a congestion window.

11. A non-transitory computer readable storage medium comprising a computer readable program for removing a middlebox from an existing network connection, wherein the computer readable program when executed on a computer causes the computer to perform the steps of:
monitoring network state information in a network connection between a client device and a server device;
determining that the connection between the client device and the server device is idle;
creating a first connection entry at the middlebox for the client device and a second connection entry at the middlebox for the server device, where the first and second connection entries are initialized using state information gathered by said monitoring after determining that the connection between the client device and the server device is idle; and
activating redirection of the network connection between the client device and the server device after determining that the connection between the client device and the server device is idle, such that the middlebox manages the created first connection entry and second connection entry to replace the network connection and mediate the connection between the client device and the server device.

* * * * *